(12) United States Patent
Napper

(10) Patent No.: US 11,790,449 B2
(45) Date of Patent: Oct. 17, 2023

(54) SEARCH SPACE MINIMIZATION FOR COMPUTERIZED TIME-SERIES DATA FORECASTING SYSTEM

(71) Applicant: TD Ameritrade IP Company, Inc., Omaha, NE (US)

(72) Inventor: Harrison W. Napper, Naperville, IL (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 0 days.

(21) Appl. No.: 18/065,912

(22) Filed: Dec. 14, 2022

(65) Prior Publication Data

US 2023/0111245 A1  Apr. 13, 2023

Related U.S. Application Data

(62) Division of application No. 16/856,840, filed on Apr. 23, 2020, now Pat. No. 11,556,985.

(51) Int. Cl.
*G06Q 40/00* (2023.01)
*G06Q 40/04* (2012.01)
(Continued)

(52) U.S. Cl.
CPC ............. *G06Q 40/04* (2013.01); *G06Q 40/06* (2013.01); *G06Q 40/125* (2013.12)

(58) Field of Classification Search
CPC ..................................................... G06Q 40/04
(Continued)

(56) References Cited

U.S. PATENT DOCUMENTS

2003/0069821 A1  4/2003 Williams
2004/0171180 A1*  9/2004 Moretti .............. H01S 5/423
                                                    438/22
(Continued)

FOREIGN PATENT DOCUMENTS

JP          6370757 B2    8/2018
JP       2019175435 A    10/2019

OTHER PUBLICATIONS

Options strategy for technology companies Published in: 2014 International Conference on Computer and Information Sciences (ICCOINS) (pp. 1-6) Authors: Teik Kheong Tan • Benny Bing (Year: 2014).*

(Continued)

*Primary Examiner* — Bruce I Ebersman
*Assistant Examiner* — John A Anderson
(74) *Attorney, Agent, or Firm* — Harness, Dickey & Pierce, P.L.C.

(57) ABSTRACT

A system includes a processor and a memory with instructions. The instructions include, in response to receiving a zoned graph request, determining a current breakeven point on a current date based on a strike price of an option. The instructions include estimating a future strike price of the option based on an expiration date of the option, determining a future breakeven point on the expiration date of the option based on the estimated future strike price, and determining a range as a current price corresponding to the current breakeven point to a future price corresponding to the future breakeven point. The instructions include, for each time between the current date and the expiration date, determining a middle breakeven point at the corresponding time based on the range and generating a zoned graph including the current breakeven point, the future breakeven point, and each middle breakeven point at the corresponding times.

9 Claims, 8 Drawing Sheets

(51) Int. Cl.
*G06Q 40/06* (2012.01)
*G06Q 40/12* (2023.01)

(58) Field of Classification Search
USPC .......................................................... 705/37
See application file for complete search history.

(56) References Cited

U.S. PATENT DOCUMENTS

| | | | |
|---|---|---|---|
| 2006/0047597 A1* | 3/2006 | Homer | G06Q 40/04 705/37 |
| 2010/0174636 A1* | 7/2010 | Hodgson | G06Q 40/00 705/37 |
| 2011/0251932 A1 | 10/2011 | Early et al. | |
| 2016/0063631 A1 | 3/2016 | Wootton et al. | |
| 2017/0308954 A1 | 10/2017 | McLaren | |

OTHER PUBLICATIONS

Parallel investments in multiple call and put options for the tracking of desired profit profiles Published in: 2017 American Control Conference (ACC) (pp. 1091-1096) Authors: Mogens Graf Plessen • Alberto Bemporad (Year: 2017).*

International Search Report and Written Opinion for PCT Application No. PCT/IB2020/058501; dated Jan. 22, 2021; 3 pages.

International Preliminary Report on Patentability for PCT Application No. PCT/IB2020/058501 dated Nov. 3, 2022.

Options strategy for technology companies 2014 International Conference on Computer and Information Sciences (ICCOINS) (pp. 1-6); Authors: Teik Kheong Tan and Benny Bing (Year: 2014).

Parallel investments in multiple call and put options for the tracking of desired profit profiles 2017 American Control Conference (ACC) (pp. 1091-1096); Authors: Mogens Graf Plessen and Alberto Bemporad (Year: 2017).

* cited by examiner

SEARCH SPACE MINIMIZATION FOR COMPUTERIZED TIME-SERIES DATA FORECASTING SYSTEM

CROSS-REFERENCE TO RELATED APPLICATION

This application is a divisional of and claims the benefit of priority under 35 U.S.C. §§ 120/121 to U.S. patent application Ser. No. 16/856,840, filed on Apr. 23, 2020, which is incorporated by reference herein in its entirety.

FIELD

The present disclosure relates to systems and methods for computerized generation of graphics displays and more particularly to systems and methods for efficiently graphing estimated future values.

BACKGROUND

Options trading can be intimidating and complicated. Users can better understand risks involved in options trading by viewing a zoned graph depicting profit and loss areas of a potential options purchase. Multiple factors can influence the overall profitability of an options trade and users may have a hard time understanding the impact each of these factors has on the overall profitability.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores instructions for execution by the at least one processor. The instructions include, in response to receiving user input for a zoned graph request including an option identifier from a user device, determining a current breakeven point on a current date based on a strike price of an option corresponding to the option identifier. The instructions include estimating a future strike price of the option corresponding to the option identifier based on an expiration date of the option, determining a future breakeven point on the expiration date of the option based on the estimated future strike price, and determining a range as a current price corresponding to the current breakeven point to a future price corresponding to the future breakeven point. The instructions include, for each time of a set of times between the current date and the expiration date, determining a middle breakeven point at the corresponding time based on the range and generating a zoned graph including the current breakeven point, the future breakeven point, and each middle breakeven point at the corresponding times.

In other features, the instructions include selecting a price equal to one price interval above the current price corresponding to the current breakeven point, determining a breakdown value of the selected price as a projected price of the option at the selected price less a cost associated with the option, and shading an upper portion of the zoned graph as a profit when the breakdown value is above zero. In other features, the instructions include shading the upper portion of the zoned graph as a loss when the breakdown value is below zero.

In other features, determining the current breakeven point on the current date based on the strike price of the option corresponding to the option identifier includes determining a first projected value of the option at a price higher than the strike price and calculating a difference between the first projected value and a cost associated with the option. In other features, the instructions include, when the difference is greater than zero, performing a point finding algorithm between the strike price and the price higher than the strike price to identify the current breakeven point.

In other features, determining the current breakeven point on the current date based on the strike price of the option corresponding to the option identifier includes determining a first projected value of the option at a price lower than the strike price and calculating a difference between the first projected value and a cost associated with the option. In other features, the instructions include, when the difference is less than zero, performing a point finding algorithm between the strike price and the price lower than the strike price to identify the current breakeven point.

In other features, for each time of the set of times between the current date and the expiration date, determining the middle breakeven point at the corresponding time based on the range includes, after determining the middle breakeven point, reducing the range to a middle price associated with the middle breakeven point and the future price. In other features, each breakeven point includes a corresponding price and a corresponding time. In other features, the memory stores a stock and option parameter database including options and each option of the options includes a corresponding stock symbol, a value, and an expiration date.

In other features, the instructions include obtaining the option data corresponding to the option from the stock and option parameter database to determine breakeven points. In other features, determining each breakeven point includes calculating a projected value of the option using a Black-Scholes pricing model and identifying teach breakeven point as between the strike price and a second price using a Newton-Raphson point finding algorithm. In other features, the second price is identified using the calculated projected value.

A method includes, in response to receiving user input for a zoned graph request including an option identifier from a user device, determining a current breakeven point on a current date based on a strike price of an option corresponding to the option identifier. The method includes estimating a future strike price of the option corresponding to the option identifier based on an expiration date of the option, determining a future breakeven point on the expiration date of the option based on the estimated future strike price, and determining a range as a current price corresponding to the current breakeven point to a future price corresponding to the future breakeven point. The method includes, for each time of a set of times between the current date and the expiration date, determining a middle breakeven point at the corresponding time based on the range and generating a zoned graph including the current breakeven point, the future breakeven point, and each middle breakeven point at the corresponding times.

In other features, the method includes selecting a price equal to one price interval above the current price corresponding to the current breakeven point, determining a breakdown value of the selected price as a projected price of the option at the selected price less a cost associated with the option, and shading an upper portion of the zoned graph as a profit when the breakdown value is above zero. In other features, the method includes shading the upper portion of the zoned graph as a loss when the breakdown value is below zero.

In other features, determining the current breakeven point on the current date based on the strike price of the option corresponding to the option identifier includes determining a first projected value of the option at a price higher than the strike price and calculating a difference between the first projected value and a cost associated with the option. In other features, the method includes, when the difference is greater than zero, performing a point finding algorithm between the strike price and the price higher than the strike price to identify the current breakeven point.

In other features, determining the current breakeven point on the current date based on the strike price of the option corresponding to the option identifier includes determining a first projected value of the option at a price lower than the strike price and calculating a difference between the first projected value and a cost associated with the option. In other features, the method includes, when the difference is less than zero, performing a point finding algorithm between the strike price and the price lower than the strike price to identify the current breakeven point. In other features, for each time of the set of times between the current date and the expiration date, determining the middle breakeven point at the corresponding time based on the range includes, after determining the middle breakeven point, reducing the range to a middle price associated with the middle breakeven point and the future price.

In other features, each breakeven point includes a corresponding price and a corresponding time. In other features, the method includes storing a stock and option parameter database including options. In other features, each option of the options includes a corresponding stock symbol, a value, and an expiration date. In other features, the method includes obtaining the option data corresponding to the option from the stock and option parameter database to determine breakeven points. In other features, determining each breakeven point includes calculating a projected value of the option using a Black-Scholes pricing model and identifying teach breakeven point as between the strike price and a second price using a Newton-Raphson point finding algorithm. In other features, the second price is identified using the calculated projected value.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
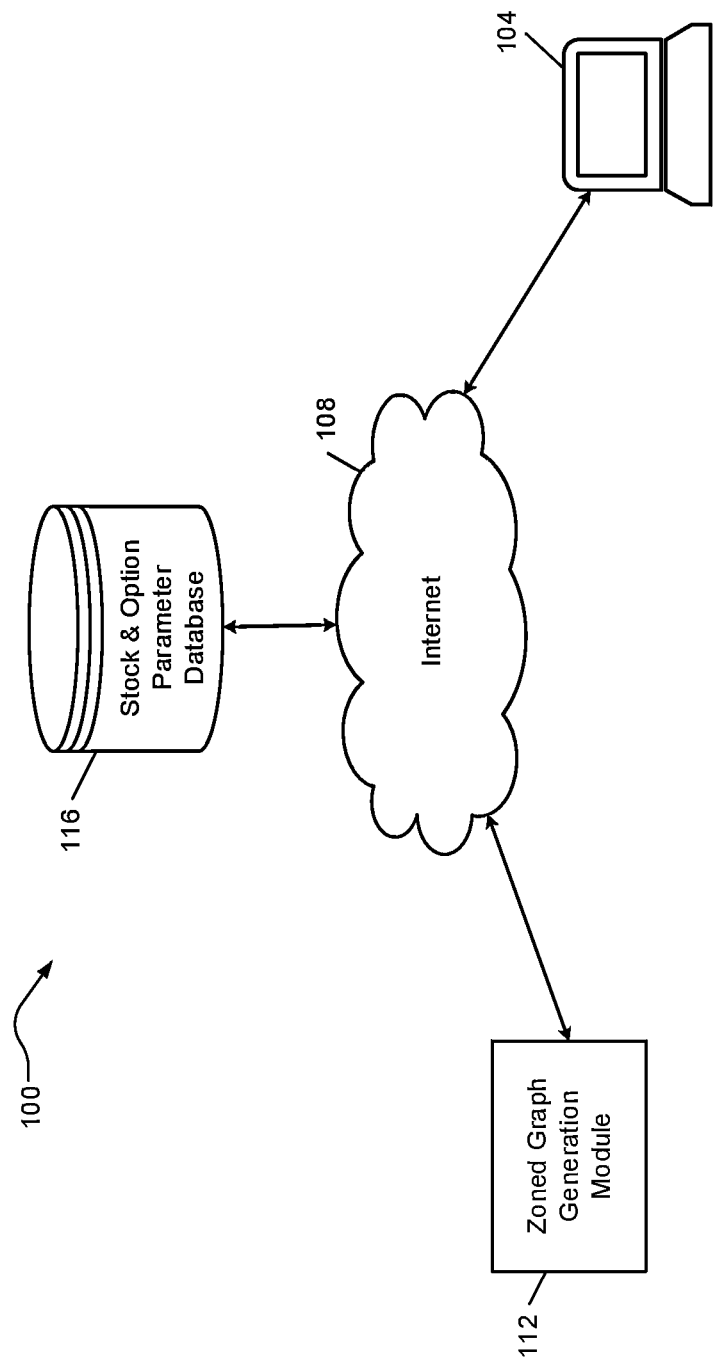
FIG. 1 is a high-level example block diagram of a zoned graph generation system.

A zoned graph generation system estimates and graphs a breakeven line for a particular option trade. The breakeven line indicates, over a period from a current date to an expiration date of the option, a value of a stock identifier associated with the particular option or options at which the purchase of the particular option would equal an end amount recovered from the option purchase or option sale. That is, the breakeven line depicts the value the stock identifier needs to reach so the user does not profit and does not lose. In other words, the zoned graph would depict what price the stock identifier needs to reach in order for the purchase of the particular option to realize a profit (or, inversely, a loss).

To determine and graph a profit and loss zone, a calculation would be needed to determine a theoretical value of the particular option (and a theoretical strike price based on a stock value) for each stock value possibility in a graph at each time interval until the option expires. This determination involves performing a Black-Scholes pricing model calculation to estimate prices and as well as implementing point finding algorithms to identify the breakeven point at each time interval. In various implementations, pricing models other than Black-Scholes can be used, such as binomial option pricing, Monte-Carlo simulation, etc. However, these calculations are computationally expensive and affect loading time and user experience.

Additionally, most importantly, to generate the zoned graph, these calculations would need to be performed for each point on the graph, making rendering difficult—if not impossible. Further, while a single graph is difficult to load, multiple graphs are even more difficult to generate and load. An added benefit of the present disclosure is that any size graph, from zero to infinity, can be rendered. Previously, the size of the graph needed to be limited (on both axes) to reduce the number of calculations performed due to complexity.

To overcome the computation obstacles, the zoned graph generation system reduces the number of points to be calculated within the zoned graph by first identifying a range of vertical values of the breakeven line. To determine the range, the zoned graph generation system determines a breakeven point at the present time and a breakeven point at expiration. Now, the vertical range of possible breakeven points is known, and drastically reduced, for each time interval between the present time and the expiration date. This minimized search space reduces processing and memory resources for the calculations.

In other words, the zoned graph generation system graphs an estimated breakeven line from the present time until expiration of the option and minimizes the calculations by determining a breakeven price range of the option by first determining a current breakeven point and a future estimated or theoretical breakeven point at expiration of the option. Then, the zoned graph generation system only needs to calculate the theoretical or projected value of the option for values (potential stock prices) between the stock value at the current breakeven point and the stock value at the future breakeven for each time interval value.

Overall, the zoned graph generation system provides users with a new way to visualize options, encouraging users to be more active options traders by making options trading more approachable and understandable. In various implementations, when looking to display annualized return, the zoned graph generation system could add functionality where the user could elect for an average rate of return, where the return is divided by the days to close the trade, or a compounded rate of return, which will assume instantaneous compounding across the duration of the position.

Block Diagram

FIG. 1 is a high-level example block diagram of a zoned graph generation system 100. A user device 104, such as a computer, tablet, mobile phone, etc., can connect to the Internet 108 to access a zoned graph generation module 112. The zoned graph generation module 112 receives user input from a user operating the user device 104 via the Internet 108 as well as stock and option parameter data from a stock & option parameter database 116 connected to the zoned graph generation module 112 via the Internet 108. The user input includes a selected option that corresponds to a stock identifier. In various implementations, the stock identifier may be a stock that the user owns. Additionally, the selected option may be a set of options that the user owns or is determining whether to purchase the option or set of options.

Based on the selected option, the zoned graph generation module 112 can obtain parameters related to the selected option from the stock and option parameter database 116, including an expiration date, a strike price, a stock price, a stock price history, etc. Then, the zoned graph generation module 112 determines a breakeven line from a current date to the expiration date of the selected option by estimating a projected value of the selected option at future dates and, from there, determining a boundary (breakeven line) between where purchase of the selected option would result in a profit and would result in a loss. The profit and loss areas are shaded to indicate, on the graphical user interface, stock values that purchase of the option would result in a profit and stock values that purchase of the option would result in a loss.

In various implementations, the zoned graph generation module 112 may generate a zoned graph for a set of options related to the same stock identifier, such as when the user purchases or is interested in purchasing an iron condor (set of options including two puts and two calls resulting in a bounded region of profit with the same expiration date) or a strangle (a combination of a put and a call option with the same expiration date). The zoned graph generation module 112 may use the Black-Scholes pricing model to determine a projected price of the option at the variety of stock prices.

That is, the zoned graph generation module 112 uses the Black-Scholes pricing model to calculate theoretical future values of the selected option or the theoretical future cost at varying stock prices of the stock identifier. In this way, the zoned graph generation module 112 can determine a breakeven value at each point in time based on the theoretical future value of the selected option less the costs. The costs would be equal to the cost of purchasing the selected option, including number of shares.

Since the Black-Scholes pricing model calculation is computationally expensive, to display the zoned graph to the user on the user interface in a minimal amount of time, the zoned graph generation module 112 reduces the number of calculations to significantly reduce loading time, enhancing user experience. For example, to determine a breakeven value at each time interval (any threshold time interval may be displayed), the zoned graph generation module 112 would need to perform a Black-Scholes pricing model calculation for an infinite number of stock values to estimate the value of the selected option as if the stock corresponding to the stock identifier were to adjust to the infinite number of stock values.

Instead, to significantly reduce the number of calculations needed to determine the breakeven line, the zoned graph generation module 112 first determines the breakeven point on a current date and on the expiration date. The breakeven point for the current date and the expiration date are identified using a point finding algorithm, such as the Newton-Raphson method. The Newton-Raphson method helps solve the problem of point finding in an infinite space using guess and check and algorithmically reduces the discretion of the check domain.

The zoned graph generation module 112 then has an estimated range of price values of the breakeven line from the current date to the expiration date as the estimated or theoretical value of the selected option would remain between the current breakeven value and the future breakeven value. Now, the number of calculations for each time interval between the current date and the expiration date has been reduced from an infinite value to the estimated range of price values. Then, for each time interval between the current date and the expiration date, the zoned graph generation module 112 determines, calculating in a direction from the current date to the expiration date, a middle breakeven value between a price of the stock at the current breakeven point and a price of the stock at the future breakeven point by calculating the projected value of the selected option at the time interval (Black-Scholes) and implementing a point finding algorithm to determine at what stock price the total profits and total losses equal zero.

The middle breakeven points are incrementally determined at each time interval and may be temporarily stored in a breakeven data store. The zoned graph generation module 112 may graph each point along the breakeven line (each breakeven point and corresponding time) and shade a profit area and a loss area to portray to the user what value the stock much reach (increase or decrease) in order for the user to realize a profit, improving user accessibility to options trading. The zoned graph generation module 112 may determine the profit area and the loss area by selecting, for each breakeven line, a point above the breakeven line and calculating a breakeven value. If the breakeven value is greater than zero, the area in which the point is should be shaded to indicate profit. The opposite side of the breakeven line should be shaded to indicate loss.

In various implementations, the Black-Scholes pricing model determines the projected price of the variety of stock prices using the corresponding strike price, the expiration date of the option, and the implied volatility of the option contract, and risk-free rate, all of which is stored, for each option, in the stock & option parameter database 116.

Example User Interfaces

Figure 2:
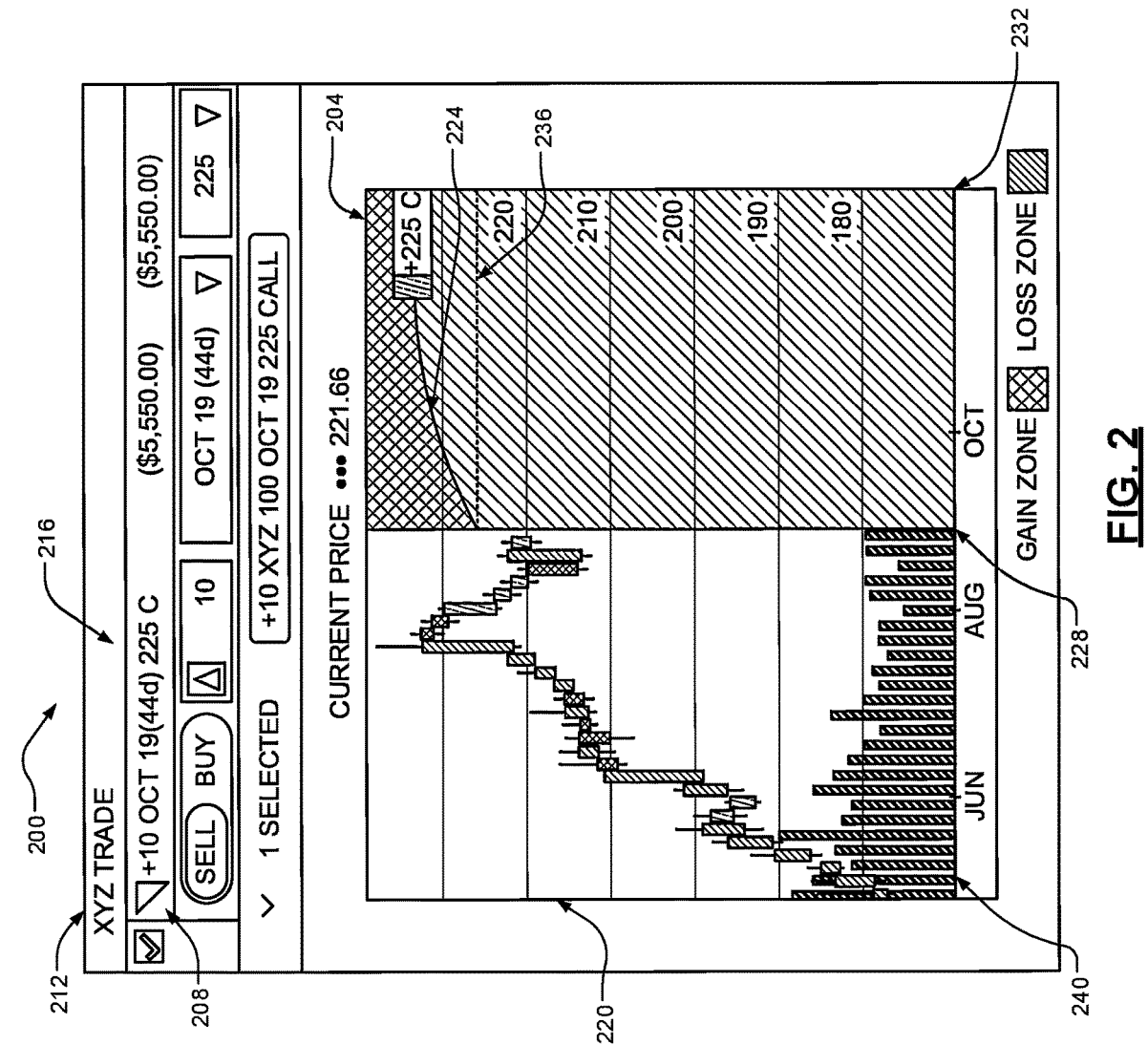
FIG. 2 is a representation of an example user interface presenting an example zoned graph of a selected option.

FIG. 2 is a representation of an example user interface 200 presenting an example zoned graph 204 of a selected option 208. As described above, the user may input through a graphical user interface or user device application the selected option corresponding to a stock identifier 212, in this case XYZ. The selected option 208 includes a corresponding strike price 216—in this example, the strike price is $225. In various implementations, the user may select the selected option 208 from a list of purchased options in the user's account. The zoned graph 204 depicts time intervals along the horizontal axis showing a range of months. In various implementations, the horizontal axis may correspond to time intervals of seconds, days, weeks, etc. The zoned graph 204 depicts along the vertical axis a range of prices of the stock identifier 212, the XYZ stock.

The example user interface 200 also shows bars 240 along the x-axis, depicting a volume of trades at the corresponding point in time along the x-axis. The bars 240 provide information to generate or calculate a moving average to indicate an average number of trades per day. In various implementations, the zoned graph 204 is only displayed. Further, a user may select the final date of the zoned graph 204. For example, the user may select a date or time by which the user would like to breakeven and generate the zoned graph 204 over the user's selected time.

The user interface 200 includes a price history graph 220 showing the price history of the stock identifier 212, the XYZ stock. The boxes of the price history graph 220 indicate the ranges the XYZ stock opens and closes while the whisker or "error" lines indicate a minimum and maximum value of the stock at the corresponding time interval. A breakeven line 224 depicts a boundary between profiting from the purchase of the selected option 208, above the line, and losing from the purchase of the selected option 208, below the line. The breakeven line 224 depicts the boundary from a current date 228 to the expiration date 232 of the selected option 208. As shown in the zoned graph 204, if the price of the stock identifier 212 is exceeding the breakeven line 224, the user will profit from selling the selected option 208. A current price line 236 illustrates a present price of the stock identifier 212. The zoned graph 204 provides a user-friendly display for users to easily identify potential profits and losses.

Figure 3:
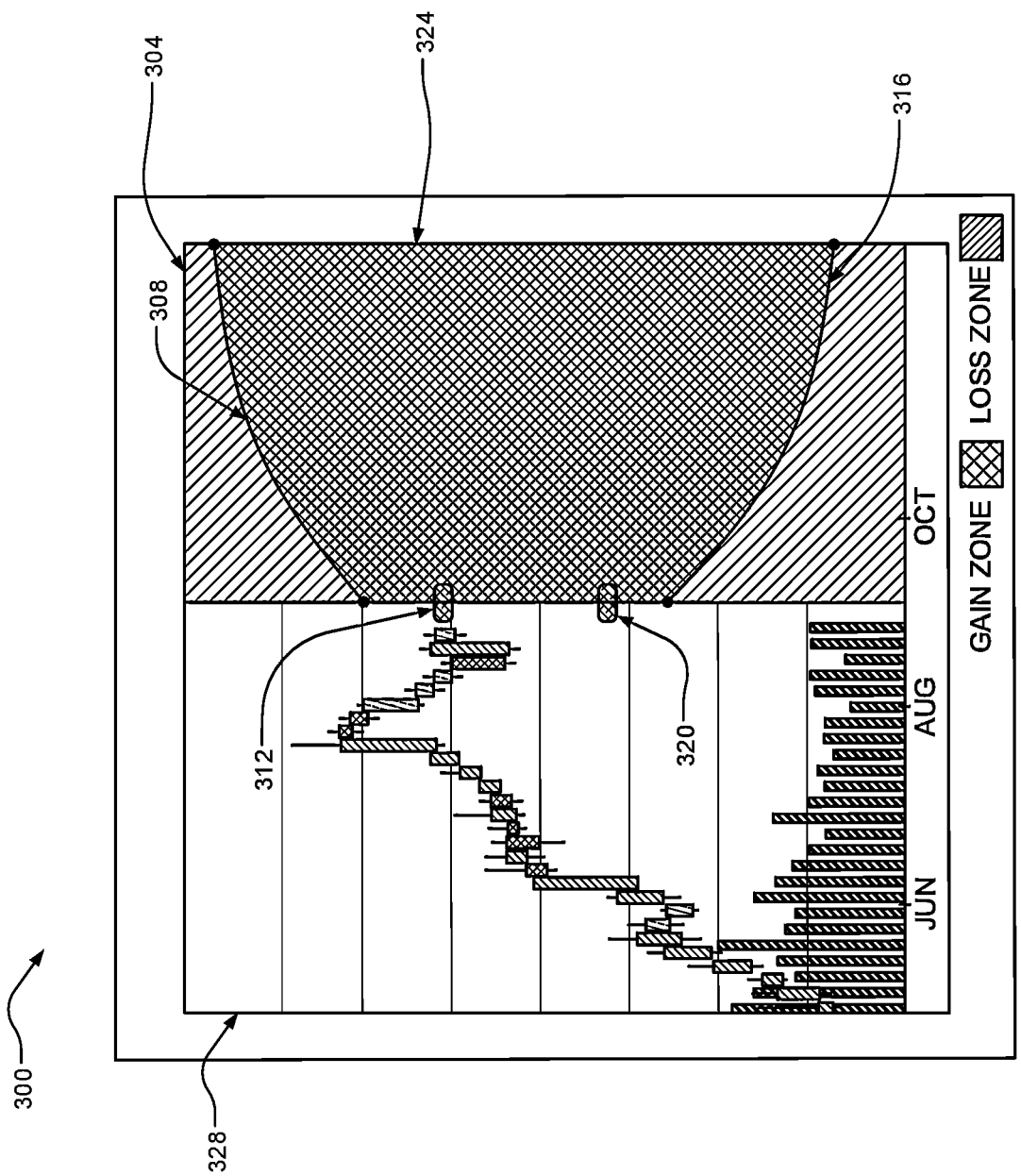
FIG. 3 is a representation of an example user interface presenting an example zoned graph of a group of options.

FIG. 3 is a representation of an example user interface 300 presenting an example zoned graph 304 of a group of options. The group of options depicted in FIG. 3 represents a "strangle" including two option contracts. For example, the zoned graph 304 displays two breakeven lines: a first breakeven line 308 representing the breakeven points of a put option with a strike price 312 and a second breakeven line 316 representing the breakeven points of a call with a strike price 320.

The zoned graph 304 displays an indication of a profit area 324, which in this case is between the two breakeven lines 308 and 316. As described in FIG. 2, the zoned graph generation system determines which area to shade as profit based on a breakeven value calculated above (or below) the breakeven line. In various implementations, such as FIG. 3 where multiple options are being displayed and are related to the same stock identifier, the zoned graph generation system determines the area to shade for each breakeven line by determining the breakeven value one interval higher or lower than the breakeven point at any time interval along the breakeven line. Additionally, a price history graph 328 is displayed for the stock identifier that corresponds to the stock option.

Generation System Diagram

Figure 4:
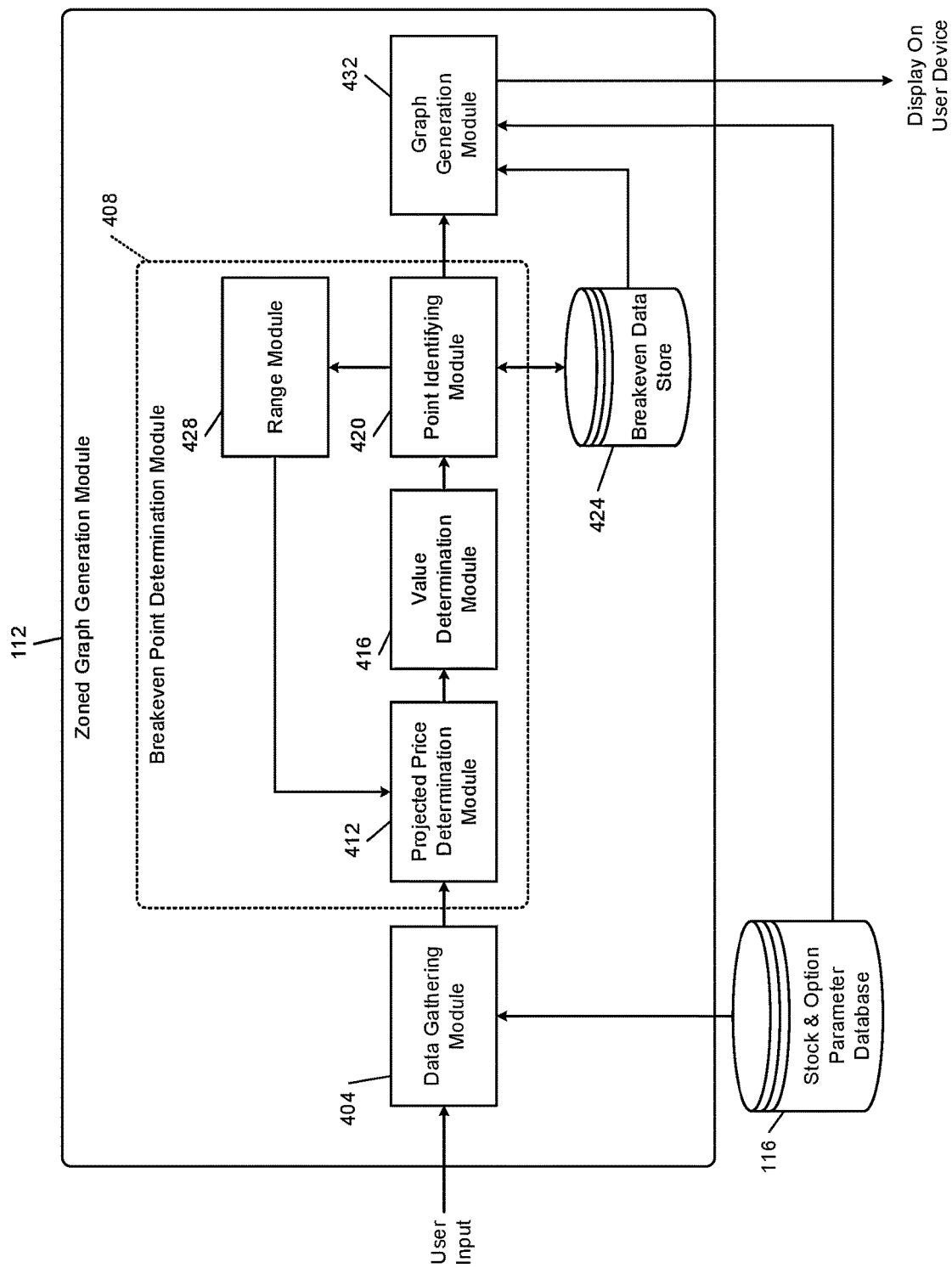
FIG. 4 is a functional block diagram of an example zoned graph generation module.

FIG. 4 is a functional block diagram of an example zoned graph generation module 112. The zoned graph generation module 112 includes a data gathering module 404 for receiving user input. The user input may include an option selection or set of options selection. As shown in the strangle of FIG. 3, multiple options of the stock can be selected and displayed on a zoned graph, the profit area between the breakeven lines depicting a region of profit based on a price of the corresponding stock identifier over the period from the current date to the expiration date.

The data gathering module 404 obtains stock and option data from the stock & option parameter database 116 to calculate projected or theoretical values of the selected option included in the user input according to the Black-Scholes pricing model. The data collected includes a present stock price and option contract data, including a strike price, an expiration data, and an implied volatility of the option. The data gathering module 404 may also collect price history data of the corresponding stock identifier to display a graph of the price history of the stock identifier.

The data gathering module 404 forwards the collected data to a breakeven point determination module 408. The breakeven point determination module 408 determines a breakeven point at each time interval (milliseconds, seconds, days, weeks, etc.) from the current date to the expiration date to generate a breakeven line. The breakeven point determination module 408 first determines a current breakeven point on the current date and a future breakeven point on the expiration date of the selected option. The breakeven point determination module 408 includes a projected price determination module 412, a value determination module 416, a point identifying module 420, and a range module 428.

The projected price determination module 412 receives a strike price or a start price of the selected option from the data gathering module 404. From the value of the start price, the projected price determination module 412 selects a price higher than the start price, which may be a set interval above the start price. The projected price determination module 412 calculates a projected or theoretical price of the selected option at the selected price using the Black-Scholes pricing model. The value determination module 416 receives the projected value of the selected option at the selected price and subtracts a cost of the selected option from the projected value. The cost of the selected option may be obtained from the stock and option parameter database 116 and forwarded from the data gathering module 404 to the value determination module 416.

The breakeven point determination module 408 calculates the breakeven value incrementally increasing the selected price by the price interval until the breakeven value exceeds zero. The value determination module 416 sets the selected price with a corresponding breakeven value above zero as an upper price bound. The upper price bound is forwarded to a point identifying module 420. If the upper price bound exceeds zero by a value less than the price interval, then the point identifying module 420 sets the upper price bound as the breakeven point.

The point identifying module 420 implements a point finding algorithm, such as the Newton-Raphson method to identify a corresponding price at which the projected value of the selected option equals the cost of the selected option, the breakeven point. The breakeven point is stored in a breakeven data store 424 associated with the corresponding time, such as the current date, the expiration date, or a time in between. The point finding algorithm identifies the breakeven point or zero value based on the start price and the upper price bound, since once the upper price bound is identified (being the first breakeven value that exceeds zero), the point identifying module 420 knows that the zero value is between the start price and the upper price bound.

The breakeven point determination module 408 performs the point identification for each start price and for price values above the start price as well as price values below the start price. For example, when identifying a breakeven point below the start price, a lower price bound is identified by the projected price determination module 412 by calculating the projected price of the selected option at a price lower than the start price (lower in increments of the price interval).

The value determination module 416 calculates the breakeven value of the price lower than the start price and the breakeven point determination module 408 continues to project prices at prices lower than the start price in price interval increments until the breakeven value of one of the lower prices is below zero. Then, the value determination module 416 identifies the selected price as the lower price bound, and the point identifying module 420 implements the point finding algorithm to determine the breakeven point.

The value determination module 416 may compare the breakeven value at a selected price to the breakeven value at the start price and determine, in a case where the selected price is increasing, that a breakeven point above the start price does not exist if the breakeven value at the selected price is lower than the breakeven value at the start price. Similarly, when the selected price is decreasing, the value determination module 416 may determine that a breakeven point does not exist below the start price if the breakeven value at the selected price is higher than the breakeven value at the start price.

The breakeven point determination module 408 identifies the breakeven point for each start price on the current date and on the expiration date, defining a bounded price range of the breakeven points of the selected option over the period from the current date to the expiration date. The breakeven point on the current date and the breakeven point on the expiration date are stored in the breakeven data store 424, along with the corresponding stock price at each point, and forwarded to a range module 428 to define the price range of the selected option.

The range is forwarded to the projected price determination module 412, which implements the same method to determine the breakeven points at each time interval between the current date and the expiration date with a limited price range and a known direction of increasing or decreasing. For example, the range module 428 determines that the price is increasing if the breakeven value at the expiration date has a higher corresponding price than the corresponding price of the breakeven value at the current date.

However, if the corresponding price of the breakeven value at the expiration date is lower than the corresponding price of the breakeven value at the current date, then the price is decreasing. Therefore, based on whether the price is increasing or decreasing, the projected price determination module 412 knows whether to select a higher or lower price for projected price determination and no longer needs to perform both calculations. Moreover, since the range module 428 forwards the price range, the number of calculations the projected price determination module 412 needs to perform to identify the middle breakeven values is automatically limited, dramatically reducing computations. Further, the range module 428 updates the range based on each middle breakeven point, the price corresponding to the current breakeven point with a price corresponding to the middle breakeven point.

For each time interval from the current date to the expiration date, a corresponding middle breakeven point is determined at stored in the breakeven data store 424. A graph generation module 432 obtains the breakeven points and corresponding times and prices from the breakeven data store 424 to generate a zoned graph for display on the user interface of the user device. In various implementations, the point identifying module 420 may generate and forward an indication that the last middle breakeven point was identified to the graph generation module 432. Additionally or alternatively, the graph generation module 432 may update the zoned graph in real time with each breakeven point. The graph generation module 432 may obtain a price history of the stock identifier directly from the stock and option parameter database 116 to graph the stock identifier performance along with the zoned graph.

The graph generation module 432 may determine a profit area and shade the profit area. The profit area may be determined based on previously determined breakeven values, as determined by the value determination module 416. In various implementations, the point identifying module 420 may store an indication of profit area based on the forwarded breakeven value from the value determination module 416 in the breakeven data store 424. For example, if the value determination module 416 forwards a positive breakeven value for a price increasing from the start price by the price interval (or more) then the area above the breakeven point is profit. Therefore, the graph generation module 432 may obtain the area of profit or loss from the breakeven data store 424 and shade the zoned graph accordingly.

Flowcharts

Figure 5:
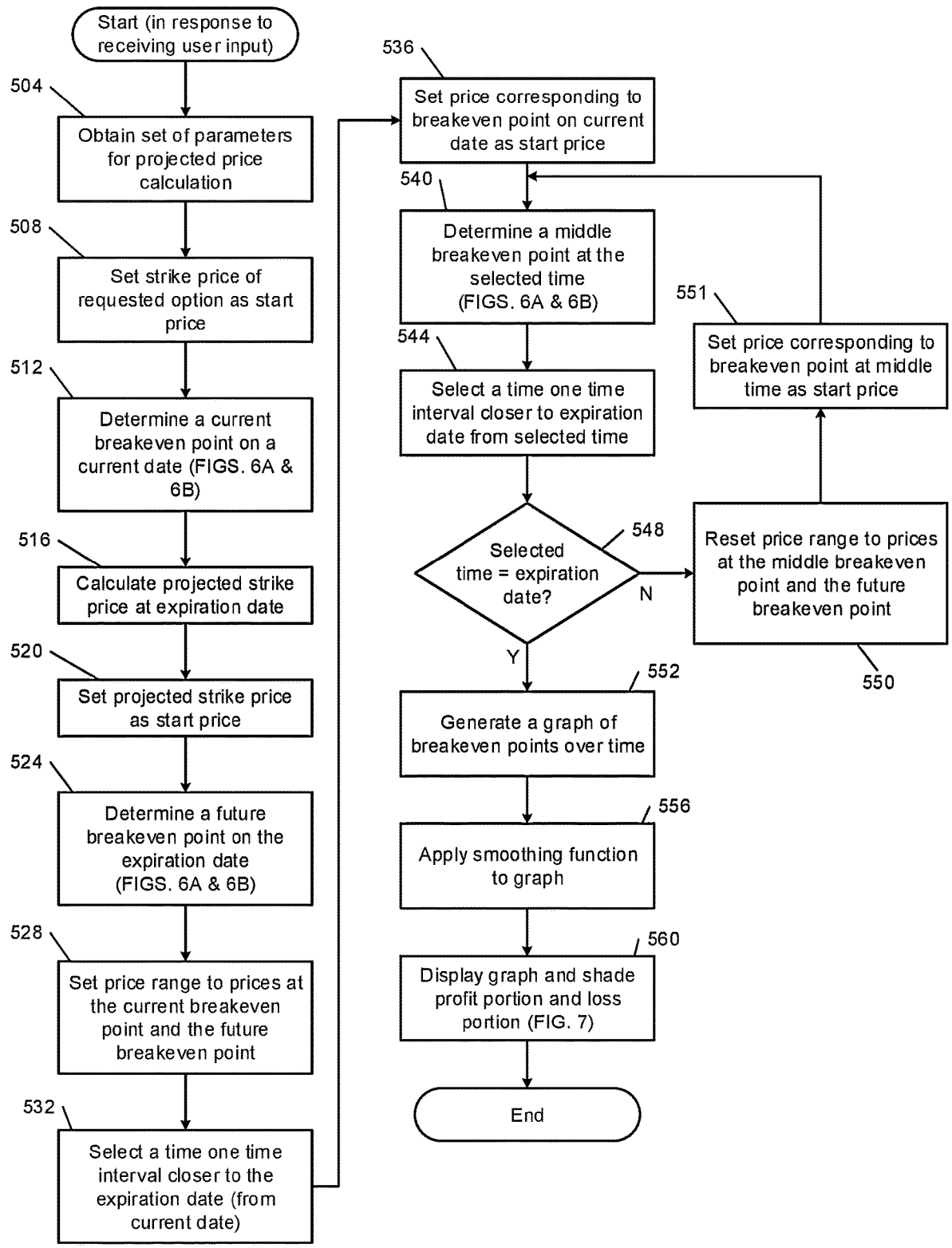
FIG. 5 is a flowchart depicting example zoned graph generation of an option.

FIG. 5 is a flowchart depicting example zoned graph generation of an option. Control begins in response to receiving user input requesting a zoned graph for a particular option. As mentioned previously, the particular option may be an option purchased in the user's account or an option the user is considering purchasing. At 504, control obtains a set of parameters for projected price calculation, such as a strike price or a start price, expiration date, etc., as described above to calculate a projected price of the particular option. At 508, control sets the strike price (obtained in the parameters for projected price calculation) of the requested option as the start price. Control continues to 512 to determine a current breakeven point on a current date as described in FIGS. 6A-6B.

Control proceeds to 516 to calculate a projected strike price at the expiration date using Black-Scholes pricing model. Control continues to 520 to set the projected strike price as the start price. At 524, control determines a future breakeven point on the expiration date of the requested option, described in the flowcharts of FIGS. 6A-6B. Control proceeds to 528 to set a price range of the requested option (that is, the range of stock prices where the breakeven points occur) to equal a price at the current breakeven point through a price at the future breakeven point. Since control determined the breakeven point now and later, the possible range of stock prices, where the breakeven point will occur over time is limited to the determined price range.

Control proceeds to 532 to select a time one time interval closer to the expiration date, starting from the current date. That is, control increments in set time intervals, starting at the current date, toward the expiration date, to determine middle breakeven points and generate a breakeven line. The current date can be set to any date or point in time, as the user selects. Additionally, the time interval can be any scale of time, seconds, hours, days, weeks, etc. Control continues to 536 to set the price of the stock at the current breakeven point to the start price. Then, at 540, control determines a middle breakeven point at the selected time, shown in FIGS. 6A-6B. Control determines to middle breakeven point as the breakeven point between to two given points: the current breakeven point and the breakeven point at expiration.

Then, control continues to 544 to select one time interval closer to the expiration date from the previously selected time. At 548, control determines if the selected time equals the expiration date. If no, control continues to 550 to reset the price range of the requested option as between the middle breakeven point and the future breakeven point. That is, since the calculations are being performed from the current date toward the future date, the range of potential breakeven points is being reduced. Then, control continues to 551 to set the price corresponding to the breakeven point at the middle time as the start price. Then, control returns to 540 to determine the middle breakeven point for the selected time. Each breakeven point is stored for plotting.

If, at 548, the selected time equals the expiration date, control continues to 552 to generate a graph of breakeven points over time. In various implementations, the breakeven points can be output to the user in forms other than a graph, such as a list, range, etc. At 556, control applies a smoothing function to the plotted points. Then, at 560, control displays the graph and shades a profit and loss portion of the graph, described in FIG. 7, to indicate to the user at what stock prices the user will realize a profit or loss if the requested option is owned.

Figure 6A:
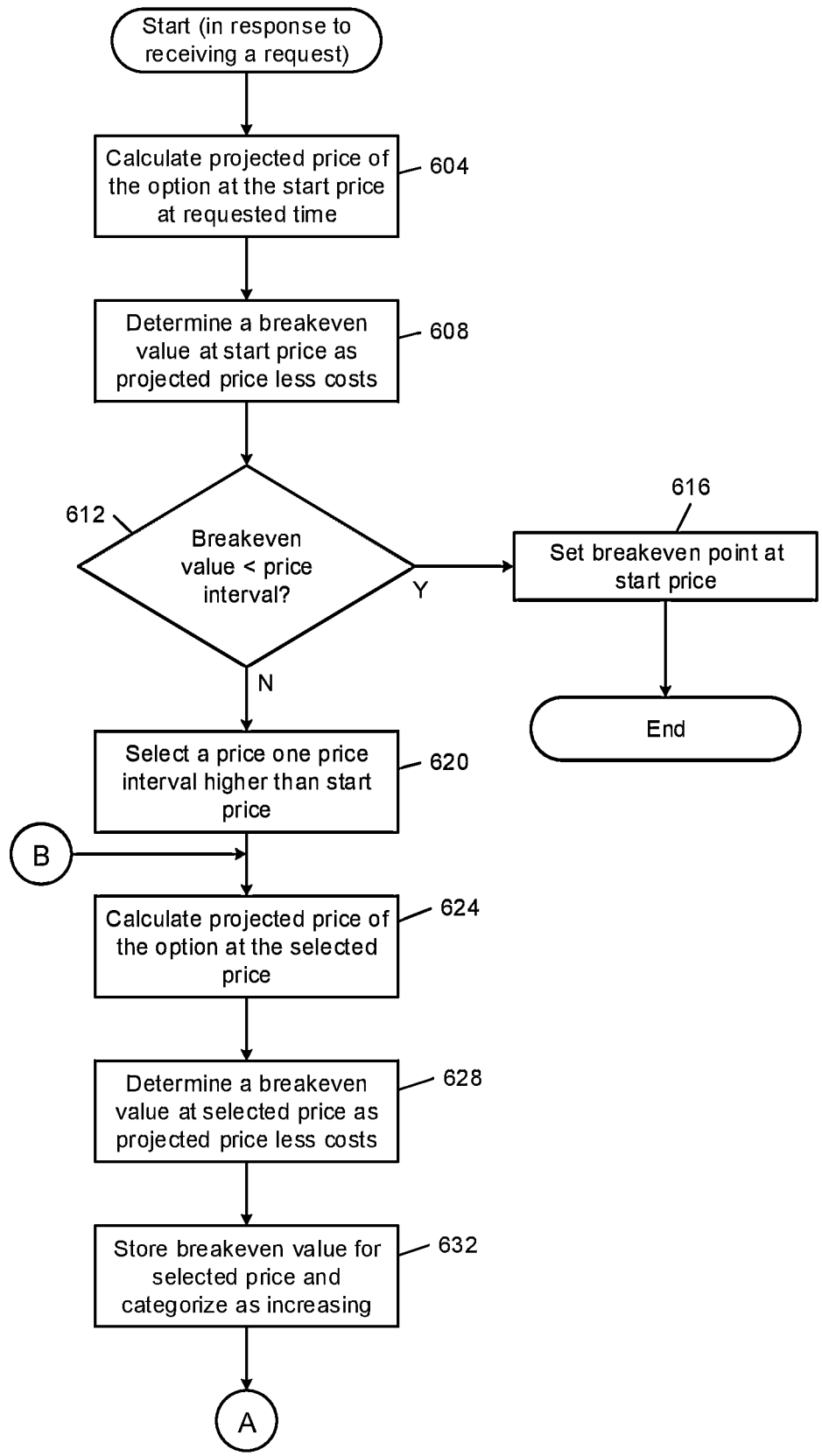
FIGS. 6A-6B are flowcharts depicting example breakeven point determination of an option at a particular time.
Figure 6B:
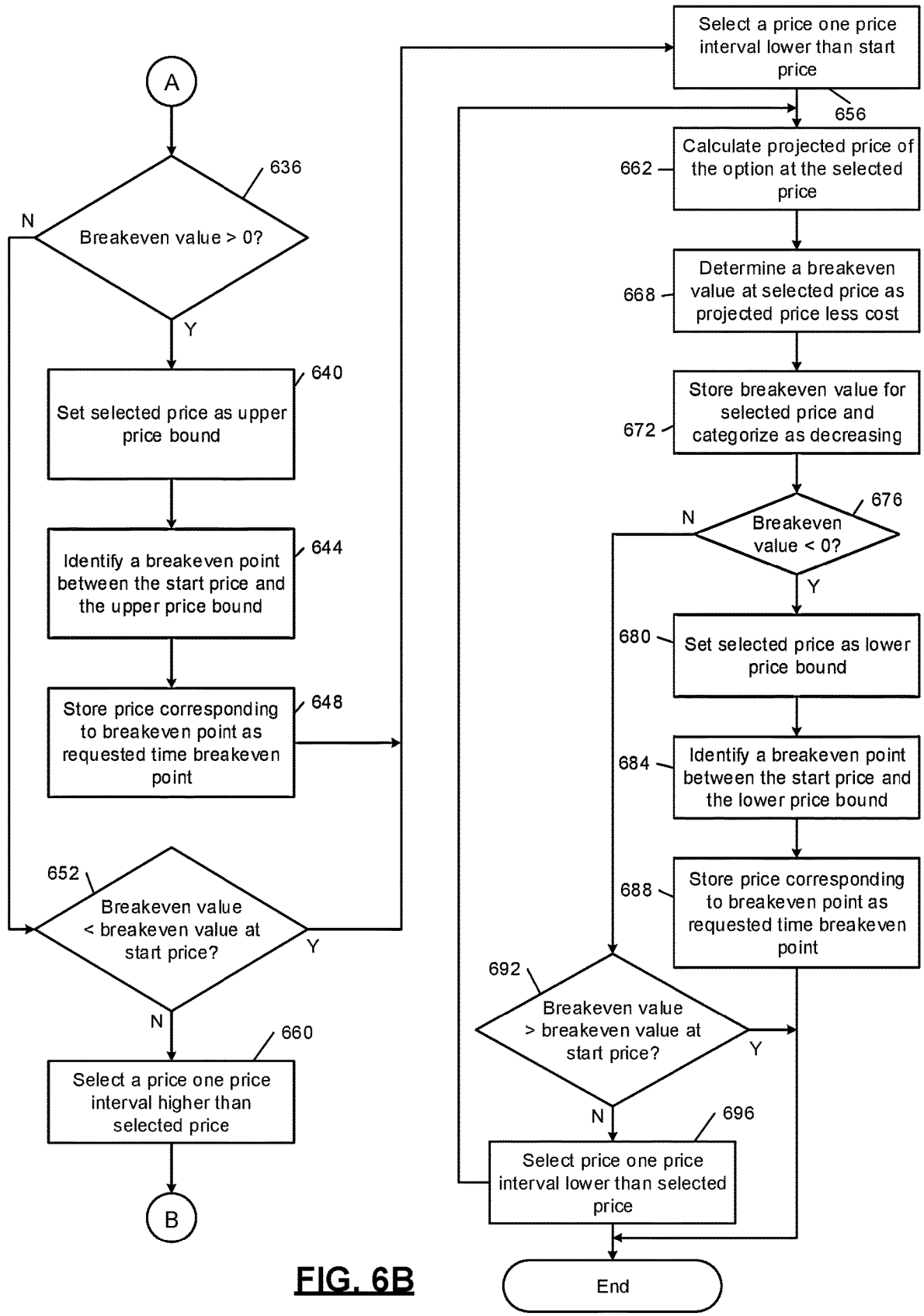

FIGS. 6A-6B are flowcharts depicting example breakeven point determination of an option at a particular time. Control begins in response to receiving a request to determine a breakeven point of an option at a requested time. The request may include a date and set a start price along with option parameters, including expiration date. At 604, control calculates a projected price of the option at the start price at the requested time.

Control continues to 608 to determine a breakeven value at the start price as the projected price less costs associated with the purchase of the option. Control continues to 612 to determine if the breakeven value is less than a price interval. In various implementations, the price interval is a preset price change indicated as ticks on the graph.

If yes, then the breakeven value at the start price is the closest price interval value to a breakeven value; therefore, control continues to 616 to set the breakeven point at the start price. Then, control ends. Otherwise, if the breakeven value is not less than the price interval, control continues to 620 to select a price one price interval higher than the start price. Then, control proceeds to 624 to calculate the projected price of the option at the selected price using, for example, Black-Scholes pricing model.

Control continues to 628 to determine a breakeven value at the selected price as the projected price less the costs associated with the purchase of the option. At 632, control stores the breakeven value for the selected price and categorizes the breakeven value as increasing. The breakeven values may be stored so that control can access the values later and determine which portions of the zone graph indicate profits and shade the zoned graph accordingly.

Control continues to 636 to determine if the breakeven value is greater than zero. If yes, control proceeds to 640 to set the selected price as the upper price bound. That is, as described above, control has identified the first occurrence of the breakeven value being above zero, indicating that the breakeven point is between the start price and the selected price. Then, control continues to 644 to identify a breakeven point between the start price and the upper price bound using a point finding algorithm, such as the Newton Raphson method.

Then, control continues to 648 to store the price corresponding to the breakeven point as the requested time breakeven point. For example, if the request was to determine the breakeven point on the current date, the breakeven point would be stored as the current breakeven point. Otherwise, if at 636, control determines that the breakeven value was not greater than zero, then control proceeds to 652 to determine if the breakeven value is less than the breakeven value at the start price.

Step 652 determines whether a breakeven point exists at a higher value than the start price. In various implementations, since the direction of the breakeven point is known from the start price of the current date towards the expiration date, when determining middle breakeven points, control can include, in the request to determine the middle breakeven points, a direction of higher or lower and FIGS. 6A-6B would only determine for the direction indicated in the request.

If, at 652, control determines that the breakeven value is less than the breakeven value at the start price, control continues to 656. Control also proceeds to 656 after storing the price at 648. Otherwise, control continues to 660 to select a price one price interval higher than the selected price and returns to 624.

Returning to 656, control selects a price one price interval lower than the start price. Then, control continues to 664 to calculate the projected price of the option at the selected price. At 668, control determines a breakeven value at the selected price as the projected price less the costs associated with the purchase of the option. Control continues to 672 to store the breakeven value for the selected price and categorize the price as decreasing.

Control continues to 676 to determine if the breakeven value is less than zero. If yes, control continues to 680 to set the selected price as the lower price bound, meaning the breakeven point is between the start price and the selected price. Then, control proceeds to 684 to identify a breakeven point between the start price and the lower price bound using a point finding algorithm. At 688, control stores the price corresponding to the breakeven point as the requested time breakeven point (for example, the future breakeven point). Then, control ends.

Returning to 676, if the breakeven value is not less than zero, control continues to 692 to determine if the breakeven value is greater than the breakeven value at the start price, checking if a breakeven point does not exist lower than the start price. If yes, control ends. Otherwise, control continues to 696 to select a price one price interval lower than the selected price. Then, control returns to 662.

Figure 7:
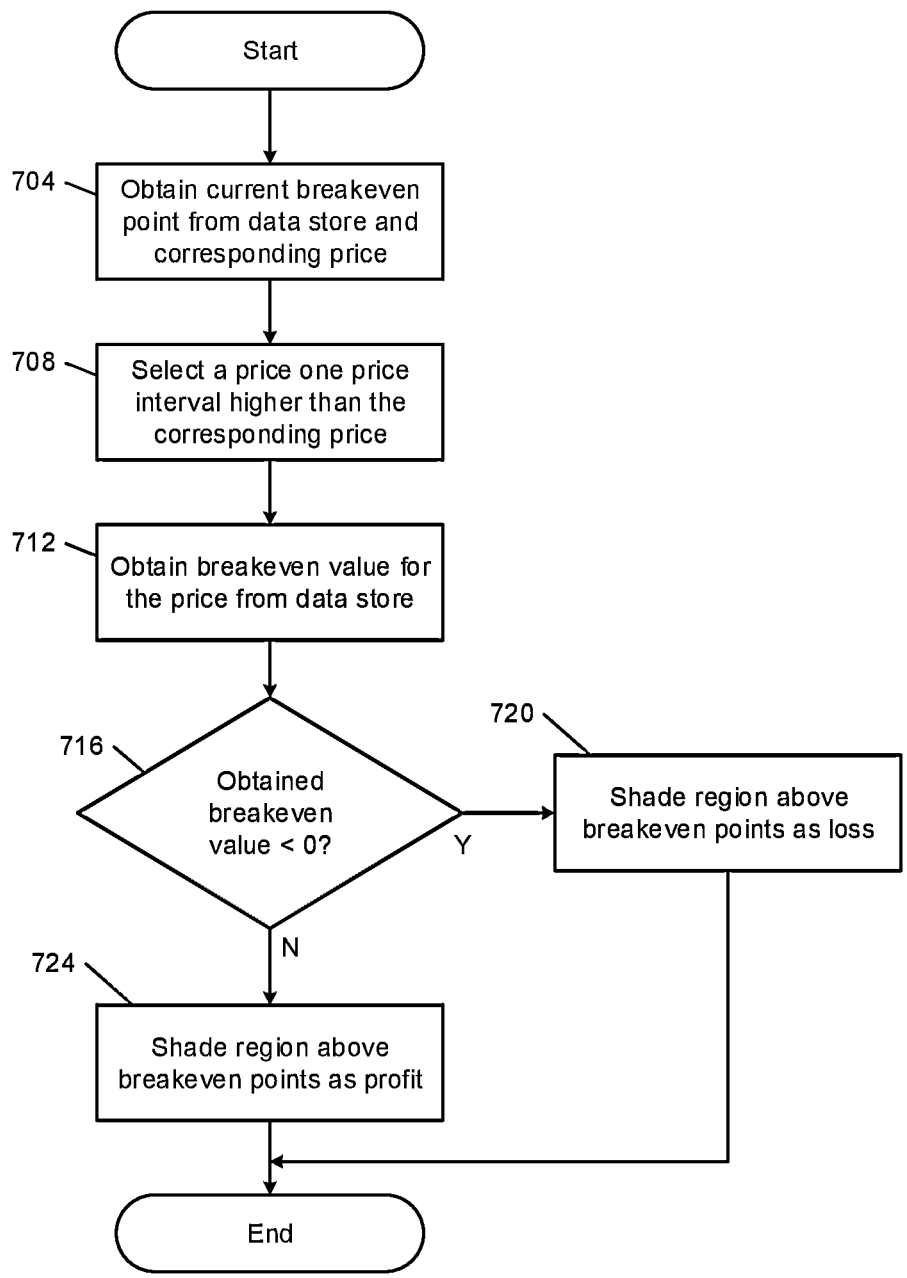
FIG. 7 is a flowchart depicting example profit area determination of an example zoned graph.

FIG. 7 is a flowchart depicting example profit area determination of an example zoned graph. Control begins in response to generating a zoned graph. Control continues to 704 to obtain a current breakeven point from the data store and a corresponding price. Control continues to 708 to select a price one price interval higher than the corresponding price. At 712, control obtains the breakeven value for the price from the data store.

Control continues to 716 to determine if the obtained breakeven value is less than zero. If yes, control continues to 720 to shade the region or portion above the breakeven points as a loss. Then, control ends. Otherwise, control continues to 724 to shade the region above the breakeven points as profit. Then, control ends.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   at least one processor; and
   a memory coupled to the at least one processor, the memory configured to store computer readable instructions which when executed by the at least one processor, causes the system to,
   in response to receiving user input for a zoned graph request including an option identifier from a user device:
   determine a current breakeven point on a current date based on a strike price of an option corresponding to the option identifier;
   estimate a future strike price of the option corresponding to the option identifier based on an expiration date of the option;
   determine a future breakeven point on the expiration date of the option based on the estimated future strike price;
   determine a range as a current price corresponding to the current breakeven point to a future price corresponding to the future breakeven point;
   for each time of a set of times between the current date and the expiration date, determine a middle breakeven point at the corresponding time based on the range; and
   generate a zoned graph including the current breakeven point, the future breakeven point, and each middle breakeven point at the corresponding time, wherein
   the determining each breakeven point further includes,
   calculating a projected value of the option using a Black-Scholes pricing model, and
   identifying each breakeven point as between the strike price and a second price using a Newton-Raphson point finding algorithm, wherein the second price is identified using the calculated projected value.

2. The system of claim 1 wherein the system is further caused to:
   selecting a price equal to one price interval above the current price corresponding to the current breakeven point;
   determine a breakdown value of the selected price as a projected price of the option at the selected price less a cost associated with the option; and
   shade an upper portion of the zoned graph as a profit when the breakdown value is above zero.

3. The system of claim 2 wherein the system is further caused to:
   shade the upper portion of the zoned graph as a loss when the breakdown value is below zero.

4. The system of claim 1 wherein the determining the current breakeven point on the current date based on the strike price of the option corresponding to the option identifier further includes:
   determining a first projected value of the option at a price higher than the strike price;
   calculating a difference between the first projected value and a cost associated with the option; and
   in response to the difference being greater than zero, performing a point finding algorithm between the strike price and the price higher than the strike price to identify the current breakeven point.

5. The system of claim 1 wherein the determining the current breakeven point on the current date based on the strike price of the option corresponding to the option identifier further includes:
   determining a first projected value of the option at a price lower than the strike price;
   calculating a difference between the first projected value and a cost associated with the option; and
   in response to the difference being less than zero, performing a point finding algorithm between the strike price and the price lower than the strike price to identify the current breakeven point.

6. The system of claim 1 wherein, for each time of the set of times between the current date and the expiration date, determining the middle breakeven point at the corresponding time based on the range further includes:
   after determining the middle breakeven point, reducing the range to a middle price associated with the middle breakeven point and the future price.

7. The system of claim 1 wherein each breakeven point includes a corresponding price and a corresponding time.

8. The system of claim 1 wherein:
   the memory is further configured to stores a stock and option parameter database including a plurality of options; and
   each option of the plurality of options includes a corresponding stock symbol, a value, and an expiration date.

9. The system of claim 8 wherein the system is further caused to:
   obtain, from the stock and option parameter database, data corresponding to the option to determine breakeven points.

* * * * *